JOHN H. SINFELT
WILLIAM F. TAYLOR   Inventors

By   *Henry Berk*

Patent Attorney 3,450,514
CONTROLLED CONVERSION OF LIGHT NAPHTHA
TO TOWN GAS
John H. Sinfelt, Berkeley Heights, and William F. Taylor, Scotch Plains, N.J., assignors to Esso Research and Engineering Company, a corporation of Delaware
Filed Jan. 20, 1964, Ser. No. 338,829
Int. Cl. C10b *57/04*
U.S. Cl. 48—214                                                                4 Claims

ABSTRACT OF THE DISCLOSURE

In generating methane-rich gas by catalyzed reaction of hydrocarbon vapors with steam at low temperatures in the range of 630° to 900° F., catalyst utilization is improved by heat exchange temperature control in an endothermic reforming zone through which the reaction mixture of hydrocarbon vapors and steam first flow to form a hydrogen-rich gas and in a subsequent exothermic methanation zone a resulting reaction mixture containing the gas then flows with moderated rise in temperature in the direction of flow.

---

This invention relates to a method and means for controlling temperatures of highly-active contact catalysts employed to convert light naphtha hydrocarbons by reaction with steam to a methane-rich gas product useful as Town Gas of high heating value.

To be economical, the catalytic synthesis of Town Gas has to employ a catalyst of adequate activity and activity maintenance. The activity of the catalyst has to be high enough to make the reaction in its initial period of use proceed at low temperatures, such as 630° to 720° F., when the catalyst is fresh in order to avoid excessive deposits of carbon and deleterious thermal or oxidation effects on the catalyst. The life of the catalyst depends on the activity of the catalyst and conditions of its use.

Studies have shown that catalysts of suitable high-activity can be prepared for the Town Gas synthesis so that they can be used for a period of about 1000 hours or longer, after which their activity decreases too rapidly for further use. The best catalysts for high-activity and activity maintenance in the Town Gas synthesis are prepared in a manner which gives the catalyst a high total-surface area and high nickel-surface area. For example, these are prepared by coprecipitation of hyroxides, carbonates, and basic carbonates of nickel and aluminum, addition of a suitable promoter to the precipitate which is then dried, calcined in air, and heated with hydrogen under controlled conditions for reducing nickel oxide in the catalyst.

In accordance with the discovery of the present invention, the high-activity catalysts are given a longer life while they are used to produce a high quality product of high methane content by adjusting the temperatures of the catalysts in particular zones or stages and in successive periods. Adjustment is made for the changes of heat of reaction, endothermic and exothermic, found to occur in a particular pattern which will be described in more detail. Adjustment can be made to take place automatically by the design of the reactor for the proper heat transfer from the exothermic zone and heat transfer to the endothermic zone. Adjustment is made to compensate for deactivation of the catalyst.

Using a high-activity catalyst freshly prepared, the reaction has been found best to be started by having the hydrocarbon feed and steam mixture contact the catalyst in an initial stage at a low temperature in the range of 630° to 720° F., preferably close to 700° F. for a period of 100 to 500 hours.

In the initial stage, the reaction is an endothermic hydrocarbon decomposition in which heat is absorbed in forming the decomposition products, resulting in a decrease in temperature. The endothermic reaction products in the resulting gaseous reaction mixture on contacting more catalyst undergo an exothermic reaction which spontaneously raises the temperature of the gaseous reaction mixture. Thus, when the Town Gas reaction is run in a conventional adiabatic reactor (for example, a cylindrical steel reactor occupied by a catalyst bed of uniform cross section), no heat is supplied from external sources other than by the sensible heat of the steam and hydrocarbon feed, and there is little heat loss by radiation from the reactor to the surrounding atmosphere. Temperature measurements made at spaced points from the inlet to the outlet of the catalyst bed show variations of temperature as depicted in a temperature profile diagram (FIGURE 1).

A number of operating difficulties result from a conventional type of adiabatic operation. For instance, use of a higher feed inlet temperature, e.g., above 720° F., to overcome the temperature drop in the endothermic zone accelerates catalyst deactivation and leads to excessively high exit temperatures in the exothermic zone and results in poorer quality product, especially as the catalyst becomes partly deactivated. As the catalyst in time becomes partly deactivated, it is desirable to use a fixed space velocity and to raise the temperature of the catalyst by only the amount required to maintain conversion. Raising the temperature of the catalyst causes faster deactivation and lowers the product quality, so that it should be done gradually and within limits.

Reaction conditions for producing a Town Gas or methane-rich fuel gas, in an adiabatic reactor, include the use of 2 to 5 parts by weight of hydrocarbon reactant vapor as feed to a bed of nickel catalyst under a pressure of 1 to 50 atmospheres, the bed of catalyst being maintained at a temperature within the range of 400° to 550° C. (i.e., 752° to 1022° F.). The hydrocarbon reactant vapor is preferably a mixture of predominantly paraffinic hydrocarbons having 4 to 10 carbon atoms per molecule, as in a low sulfur content light naphtha distillate boiling in the range of 96° to 345° F. The optimum amount of steam is close to 2 parts by weight per 1 part by weight of hydrocarbon, and the optimum pressure is in the range of 10 to 25 atmospheres to produce a gas containing at least 50% by volume of methane after removal of carbon dioxide and water vapor.

The operating conditions described are operative in a short run but are not suitable or practical for use with a highly active catalyst which is to be used in a long run with high activity maintenance, and this is so particularly with respect to temperature control.

A nickel catalyst of relatively low activity, such as formed by the conventional method of impregnating alumina or kieselguhr, which does not contain a suitable promoter, or which contains an anti-catalyst or inhibitor, may function in a short run with the higher temperatures starting at 752° F. to temperatures as high as 1022° F., but will become rapidly deactivated and have a very short life.

The activity and life of a catalyst have to be relative measurements based on performance in conversion of a selected hydrocarbon feed under comparative test conditions. For example, running with a feed of principally n-hexane at 700° F. average temperature, 500 p.s.i.g., 2 lbs. $H_2O$/lb. feed at a space velocity of 5.6 lbs. feed/lb. catalyst/hr., a low activity Ni on kieselguhr catalyst with no promoter, gave an initial conversion of only 81% and rapidly became deactivated so that its life was less than 100 hrs. Running at the same conditions, a high-activity catalyst, e.g., Ba, Cs, Fe, Ce, La, or K promoted Ni–Al$_2$O$_3$ catalyst obtained by coprecipitation with controlled drying and calcining in air, gave initial conversions of 97 to 100% and had life periods of 400 hrs. and higher. The Ba promoted catalyst gave a conversion of 95% or better for 300 hrs. running at 5.6 lbs. per hour of hexane per lb. of catalyst at 700° F., 500 p.s.i.g. and 2 lbs. H$_2$O/lb. hexane. Unpromoted Ni on alumina is in the same low class of activity as Ni on kieselguhr. These comparative runs were made with temperature control using transfer of heat from the exothermic zone to the endothermic zone.

The method of catalyst preparation is important for activity and details will be given on the preferred techniques; however, the activity and loss of activity of the catalysts are indicated generally by surface area measurements according to a common N$_2$ gas adsorption test, which measures total surface area, or H$_2$ chemisorption, which measures the area of reduced metal. Fresh high-activity catalysts generally have total surface areas of about 100 square meters/gram and nickel surface areas above 20 square meters/gram of catalyst. Low activity catalysts have lower surface areas, e.g., total <100 m.$^2$/g., Ni <20 m.$^2$/g.; high activity catalysts have a total surface area >100 m.$^2$/g., Ni >20 m.$^2$/g.

Further details will be given with reference to drawings and examples.

In the drawings, FIGURE 1 shows a diagram of the temperatures at spaced points through the length of a bed of high-activity catalyst in a conventional adiabatic reactor having no substantial heat transfer from the exothermic or heat transfer to the endothermic zone. The temperature profile makes the shown S shaped curve.

Figure 1:
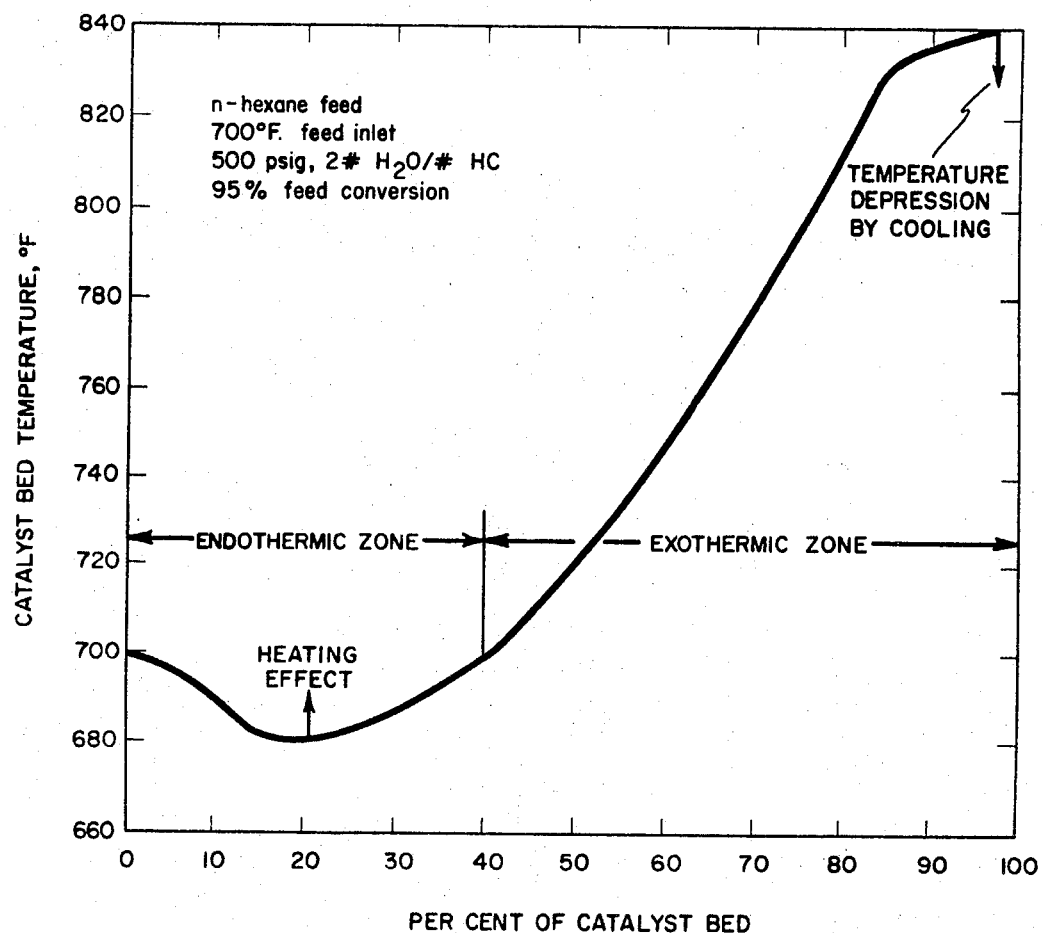

In FIGURE 1, the inlet temperature of the bed in an adiabatic reactor is shown to be 700° F. and for 40% of the bed depth or length the temperature is lower than 700° F. in what is termed the endothermic zone. In the remaining 60% of the bed depth, termed the exothermic zone, the temperature rises rapidly to the outlet temperature of 840° F. If the inlet temperature is raised substantially, say to 780° F. or higher, in the adiabatic reactor, the average and outlet temperatures rise correspondingly and the catalyst then has a fast and excessive deactivation rate. By indirect heat exchange, cooling of the exothermic catalyst zone with a cooling fluid, the temperature gradient in this zone can be depressed and the average difference between the minimum and maximum temperatures can be kept down in the range of 90° to 120° F.

Although two reactor designs for temperature control are shown in the drawing, there is flexibility in modifying the designs to use the principles of the present invention, including means and steps for keeping the average and maximum temperatures at sufficiently low levels to prevent accelerated deactivation while maintaining product quality and for adjusting the temperature to higher levels as the catalyst becomes partly deactivated to maintain conversion with avoidance of accelerated deactivation. The endothermic and exothermic zones may be in one or more reactor vessels or chambers with means for adding heat to the endothermic zone and for removing heat from the exothermic zone. A single reactor vessel may be more economical for construction and for servicing, e.g., for replacing spent catalyst. Various known means for measuring and controlling temperatures, pressures and flow of fluids may be used but are not shown for the sake of simplicity. It is also possible to control the temperatures of the zone separately to achieve desired advantages.

Figure 2:
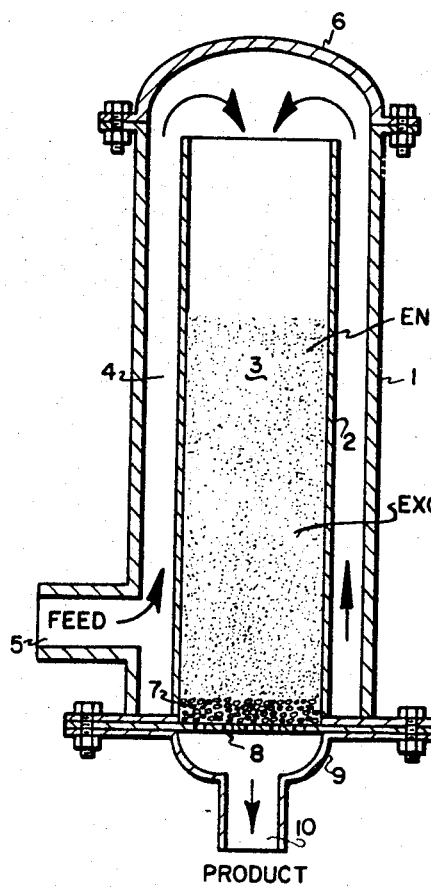
FIGURE 2 shows schematically a design of a reactor in cross-section for obtaining heat transfer from the exothermic zone to the endothermic zone by use of gaseous fluid feed as the heat exchange medium.

In FIGURE 2, an outer cylindrical vessel 1 is concentric with the inner cylindrical vessel 2 which holds a bed of catalyst 3. Between vessels 1 and 2 is an annular passage 4 up through which flows hydrocarbon vapor with steam from entrance 5 near the bottom of vessel 1. Vessel 1 has a removable gas tight fitting closure 6. The catalyst bed 3 is supported in vessel 2 on a gas permeable shallow bed of material 7 and said material, such as porcelain, pebbles and inert ceramic balls, rests on a perforated plate 8 at the bottom of vessel 2, a bottom closure 9 clamps the removable plate 8 in position and provides the outlet 10 for product gases in this unit. The hydrocarbon vapor and steam passing up through the annular passage 4 are in heat exchange with the hotter catalyst at the bottom of the bed 3 where the exothermic zone is located and they thus become heated and transfer heat as they flow upwardly to the upper part of the catalyst bed 3 where the endothermic zone is located. Using this kind of unit, the hydrocarbon vapor feed and stream may be preheated to a lower temperature, e.g., 600° to 700° F. so that they remove heat from the exothermic zone which may be at an elevated temperature such as 720° to 900° F. The vapors thus have their temperature raised, and as they flow upwardly they impart heat to the upper endothermic catalyst zone which may be at a temperature of 630° to 720° F. Following this heat exchange the vapors at the top of the annular passage flow downwardly into the vessel 2 to enter the top of the catalyst bed where the endothermic zone begins.

Modifications may be made in the apparatus shown in FIGURE 2 for the use of other means of removing heat or adding heat to the various sections as desired. For example, insulation may be placed around the upper part of vessel 1 and heating elements may be added at the upper part of vessel 1. An apparatus of similar construction may have catalyst in the annular passage 4, which would then serve as the initial endothermic catalyst reaction zone receiving heat by conduction from catalyst bed 3 where the exothermic reaction would take place.

Figure 3:
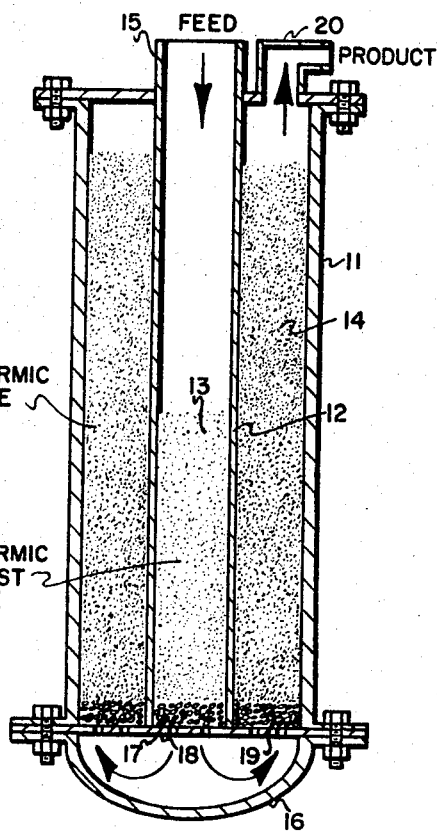
FIGURE 3 shows schematically a design of the reactor in cross-section for obtaining heat transfer from the exothermic reaction zone to the endothermic zone by conduction and convection.

In FIGURE 3, the reactor apparatus is made up of an outer vessel 11, an inner concentric cylinder 12 which contains a catalyst bed 13, and which leaves an annular passage 14. The hydrocarbon vapor and steam feed enters the upper part of the cylinder 12 through entrance 15 to pass through the catalyst bed 13 where the endothermic reaction takes place. The outer vessel 11 has a removable bottom closure 16. The bed of granular catalyst 13 rests on inert supporting material 17, which in turn is supported by a removable perforated plate 18, held in place by being clamped between the bottom of vessel 11 and the closure 16. The same perforated support 18 similarly may support inert pebbles 19 or other pervious material which permits the flow of gases up through catalyst located in the annular passage 14 to constitute the exothermic zone. The product gas leaving the top of the exothermic zone is withdrawn through an outlet 20. In this arrangement the feed passes in downflow through the endothermic catalyst zone which receives heat conducted thereto from the surrounding exothermic catalyst zone. The catalyst bed 13 may be varied in depth, in relation to the depth of the bed in the annular zone 14. For example, the amount of catalyst in the endothermic catalyst zone bed 13 may be 40% to 50% of total catalyst used in both zones 13 and 14. The catalyst used in each of the zones may be the same or different composition, and catalyst in both zones are preferably of high activity.

The design of the reactors shown in FIGURE 2 and

FIGURE 3 are indicated to be of simplified form for easy access to the catalyst which permits economical servicing, but various other arrangements may be made for removing heat from the exotherime zone and for adding heat to the endothermic zone so as to obtain the benefits of better temperature control. Although the reactions occurring in the endothermic and the exothermic zones are more complex, they may be set forth in a simplified manner as involving the following series of reactions:

Endothermic reforming (cracking, dehydrogenation, oxidation)

$$C_xH_y + XH_2O \rightarrow XCO + (X+Y/2)H_2$$

Exothermic (Methanation) $CO + 3H_2 \rightleftharpoons CH_4 + H_2O$ (Water Gas Shift) $CO + H_2O \rightleftharpoons CO_2 + H_2$ It is to be noted that assuming that the principle hydrocarbon reactant is hexane in which $C_xH_y$ is $C_6H_{14}$, the use of 2 lbs. of steam per lb. of hydorcarbon makes an excess of $H_2O$ for the over-all reaction in which the product gas contains approximately 7.0 moles $H_2O$, 4.7 moles $CH_4$, 1.3 moles $CO_2$ and 0.2 mole $H_2$ per mole of hexane feed at 100% hexane conversion on a theoretical basis. Actual analysis showed that the reaction mixture near the inlet of the endothermic zone contains principally $H_2$ with $CO_2$ and $CO$ as conversion products with a low amount of $CH_4$ and that as the reaction mixture proceeds further through the catalyst bed into the exothermic zone, the $CH_4$ content rises considerably, the $CO_2$ content remains relatively constant, the $CO$ content remains low, while the content of $H_2$ diminishes.

The reactor effluent composition at 100% hexane conversion is controlled by the thermodynamic equilibrium for the methanation and water gas shift reactions. Thus, lower exit bed temperatures favor $CH_4$ production, while higher temperature favor $H_2$ production.

Catalysts of high activity have been prepared by the technique of precipitating nickel and aluminum compounds of the group consisting of hydroxides, carbonates, and basic carbonates from an aqueous solution of the nitrate salts of nickel and aluminum with an ammonium compound such as ammonium bicarbonate with the nickel and aluminum compounds proportioned so that the precipitate contains on a dry basis 40 to 60 percent Ni and 60 to 40 wt. percent $Al_2O_3$. The proper promoter compounds have been admixed with the wet precipitate before it is dried at 200° to 400° F., then calcined in air at 600° to 925° F. The calcined catalyst is then activated by treatment with hydrogen to reduce the nickel oxide and this reduction is carried out conveniently by treating the calcined catalyst in the reactor just prior to its use so as to avoid reoxidation because the reduced nickel is readily oxidized, even at ordinary temperatures.

Unlike a catalyst formed by precipitating nickel onto preformed alumina particles as a support, the catalyst formed by the coprecipitation technique has an interspersion of the nickel oxide with the aluminum oxide. This leads to greater stability and results in a total surface of about 100 to 200 square meters per gram and a nickel surface area of 20 to 50 square meters per gram of catalyst when the catalyst is activated. The total surface area is measured by low temperature $N_2$ adsorption and the nickel area is measured by $H_2$ chemisorption. The catalyst granules that are formed are of suitable strength and size for use. The technique of preparing the catalyst is illustrated by the following specific examples:

EXAMPLE 1.—BARIUM-PROMOTED Ni-Al₂O₃ COPRECIPITATION CATALYST

A barium promoted catalyst was made by dissolving 750 g. of $Ni(NO_3)_2 \cdot 6H_2O$ and 740 g. of $Al(NO_3)_3 \cdot 9H_2O$ in 3.0 liters of deionized water. Coprecipitation is carried out by adding 1040 g. of $NH_4HCO_3$ while keeping slurry temperature at approximately 32° F. At the end of the addition, the slurry was stirred an additional 10 minutes and then filtered. To the precipitate 17.2 g. of $Ba(NO_3)_2$ was added and mixed well. The mixture was dried at 350° F. for at least 10 hours and then calcined in air for 4 hours at 750° F. This catalyst analyzed 45.6 wt. percent nickel and 3.2 wt. percent barium and had a total surface area of 145 m.²/g. catalyst.

In the coprecipitation, the precipitant is preferably added to form a slurry in the range of 32° to 212° F., or to the temperature at which boiling occurs. The catalyst formed by this coprecipitation technique was given a standardized test after activation with $H_2$ for 10 hours at 750° F. under 25 p.s.i.g. This catalyst was found to give 100% conversion of a light desulfurized naphtha containing principally pentane and hexane using a space velocity of 2.8 w./w./hr. under a pressure of 500 p.s.i.g. with 2 lbs. $H_2O$/lb. of hydrocarbon feed. The barium promoted catalyst of nickel interspersed with $Al_2O_3$ was then given a life test in a reactor with temperature control by transferring heat from the exothermic zone to the endothermic zone so as to prevent excessive rise of temperature at the exothermic zone outlet and to moderate the drop of temperature in the endothermic zone. The average difference between the minimum and maximum temperature in the catalyst was thus kept in the range of 90° to 120° F., rather than the 150° to 200° F. average difference between minimum and maximum temperatures that would occur in a reactor without temperature control by transferring heat.

In the first 109 hours of the life test, a low operating temperature was used for giving nearly complete conversion and the initial temperature was then set at 660° to 680° F. The average temperature was then steadily increased in small increments over periods of time to maintain a conversion at or above 90%. Thus, it was found necessary to raise the average temperature only 5° F. every 55 hours. The following table summarizes the life test results:

TABLE I.—CONVERSION, MATERIAL BALANCE, AND HEATING VALUE LIFE TEST FOR Ba PROMOTED Ni-Al₂O₃

[Conditions: 2.8 lbs. naphtha/lb. catalyst/hr., 2 lbs. H₂O/lb. naphtha, 500 p.s.i.g.]

| Hours | Inlet, T., °F.[1] | Percent naphtha conv. | Over-all material balance | Heating value, B.t.u./s.c.f. |
|---|---|---|---|---|
| 10–18 [2] | 680 | 99.8 | 92.9 | 954 |
| 92–100 | 660 | 79.6 | 97.2 | 1010 |
| 181–89 | 685 | 98.2 | 104.1 | 952 |
| 229–37 | 685 | 95.8 | 97.7 | 967 |
| 301–09 | 690 | 96.2 | 100.7 | 965 |
| 397–405 | 700 | 97.0 | 99.9 | 954 |
| 493–501 | 705 | 94.8 | 103.7 | 970 |
| 589–97 | 710 | 94.5 | 102.1 | 974 |
| 733–41 | 725 | 93.3 | 98.1 | 977 |
| 797–805 [2] | 730 | 96.0 | 100.3 | 954 |
| 869–877 [2] | 735 | 96.5 | 99.9 | 943 |
| 901–09 | 740 | 90.16 | 100.8 | 971 |
| 1072–1080 | 765 | 87.5 | 100.4 | 958 |
| 1144–1152 | | 84.1 | 98.9 | 948 |

[1] Inlet T., °F. is the inlet or average maximum temperature in the endothermic zone so that the average maximum in the exothermic zone is only 90° to 120° F. higher.
[2] Feed was n-hexane. Feed was otherwise desulfurized naphtha containing principally C₅ and C₆ paraffins.

Table I summarizes the conversion and heating value data for over 1150 hours. It can be seen that after 909 hours the conversion was still above 90% and the heating value was 971 B.t.u./s.c.f. From this table it can be seen that the average temperature level could be kept very low throughout the entire run lasting more than 1000 hours by transfer of heat from the exothermic zone to the endothermic zone, which may be carried out in accordance with the principles described utilizing apparatus which permits heat transfer as shown. For the substantial initial period of 100 to about 700 hours, with the highly active catalyst used, the temperatures of the endothermic zone are in the range of 630° to 720° F.

Using the coprecipitation technique as described in the foregoing example, suitable high activity catalysts may be obtained by substituting other promoters, for example, using in place of barium nitrate, nitrates of strontium, cesium, yttrium, lanthanum, cerium or of mixed lanthanide rare earth rich in lanthanum and cerium, and of potassium. The promoting action of these various promoters can be ranked somewhat in the order of Ba, La, Sr, Cs, Ce, Y or K, the Ba being best. There are other possible good promoters such as Fe. In use of the Fe promoter, the Fe hydroxide, carbonate or basic carbonate may be coprecipitated with such compounds of nickel and aluminum. The promoter metal may be admixed in a proportion of 0.001 up to 1.0 promoter metal atoms per Ni atom, the nickel being present in the catalyst in a proportion of 0.4 to 1.3 gram atoms of nickel per gram atom of aluminum.

Another type of catalyst which has shown high activity is formed by coprecipitating nickel with silicate ions by addition of basic ammonium carbonates to a slurried kieselguhr, then drying, calcining in air, and finally activating with hydrogen under conditions prescribed for the coprecipitated nickel and aluminum with added admixed promoter.

A typical gas product obtained at above 90% conversion using the barium promoted high activity catalyst as described in the foregoing example is shown in the following table:

Table II.—Gas composition with $H_2O$ and $C_2+$ material removed (92.4% conversion with Ba promoted catalyst)

| | |
|---|---|
| $CH_4$ | 70.30 |
| $H_2$ | 8.45 |
| $CO$ | 0.06 |
| $CO_2$ | 21.19 |
| Heat value B.t.u./s.c.f. (dry, but 2% $CO_2$ removed) | 917 |

Whether the catalysts are of the type containing nickel interspersed with alumina or with silica, as by the coprecipitation technique, and are promoted or unpromoted by suitable promoting metals as indicated, in general, they have high activity if they have a total surface area of 100 to 200 m.$^2$/g. and a nickel surface area of 20 to 50 m.$^2$/g. When the activity of these catalysts for the Town Gas reaction declines, the surface areas diminish. The decline in activity is accelerated as the temperature of the catalyst is increased until the catalyst becomes too deactivated for use in producing the desired product. The deactivated or spent catalyst has a total surface area substantially below 100 m.$^2$/g. and a nickel surface substantially below 20 m.$^2$/g.

The deactivation of the catalyst may be considered as being caused by sintering or oxidation of the nickel, both of which are increased at higher temperatures. The amount of carbon deposition can be kept low enough at controlled temperatures, low enough not to be a factor in the conversion level. Sulfur is a poison but when kept sufficiently low, less than 3 p.p.m., it does not interfere with the process. Sulfur may lower activity by deadening part of the catalyst surface area and indirectly thus bring about sintering by necessarily requiring higher temperatures to obtain conversion. Use of a lower sulfur-containing feed helps to overcome sulfur poisoning and permits activity to be maintained for longer periods of time.

As indicated in FIGURE 1, when a highly active catalyst is being used to give nearly 100% conversion for the Town Gas reaction in an adiabatic reactor, the temperature of the catalyst in the endothermic zone tends to be as much as 20° to 40° F. lower than the inlet (700° F.) temperature of the endothermic zone and the catalyst outlet temperature (840° F.) in the exothermic zone tends to be 140° F. higher. Thus, in making an extended adiabatic run with raising of the inlet temperature about 100° F. to maintain a high conversion level, the temperature of the catalyst in the exothermic zone tends to be increased to above 925° F. and at such high temperatures sintering of the nickel becomes rapid.

The endothermic zone is considered to extend from its inlet through about 40 to 50% of the catalyst bed where the temperature rises above the inlet temperature, even though some exothermic reaction takes place simultaneously with the endothermic reaction in what is regarded as the endothermic zone. Hydrogen and $CO_2$ are principally formed initially in the endothermic zone, then increasing amounts of methane are formed and the quantity of $H_2$ falls. The methanation reaction continues through the exothermic zone. The formation of $CO_2$ tends to come to an equilibrium.

It has been observed that if the activity of the catalyst is low in one of the zones, this adversely affects the activity of the catalyst in the other zone. This causes a decline for both the endothermic and exothermic zones combined. If there is a decline of activity in the catalyst in the endothermic zone or if the conversion level is too low on account of the low temperature level, this adversely affects the reaction and catalyst in the exothermic zone. In accordance with the present invention, the difficulties which are accentuated in an adiabatic operation are largely overcome by removing heat from and lowering the temperature of the catalyst in the exothermic reaction zone and this is obtainable by a countercurrent flow of a relatively cooler fluid such as the feed in indirect heat exchange with the product flow. By this means, heat removed from the exothermic zone can then be transferred by the cooler fluid heated to above the minimum temperature to the endothermic zone for raising the minimum temperature in the endothermic zone using an apparatus such as shown in FIGURE 2 or FIGURE 3. The mixture of hydrocarbon and steam supplied to the unit at a temperature sufficiently below the desired catalyst inlet temperature so that there is a high temperature difference between the temperature of the entrance feed and of the products near the exit of the exothermic zone which is at the bottom of bed 3 in FIGURE 2 and at the top of the catalyst bed 14 in FIGURE 3. The feed mixture thus absorbs heat and conveys the heat to the inlet of the endothermic zone catalyst which is at the top of bed 3 in FIGURE 2 and at the top of bed 13 in FIGURE 3. Thus, throughout a long run, e.g., for 500 hours to over 1000 hours, the temperature at the inlet of the endothermic zone is to be maintained preferably in the range of 660° to 720° F. with the temperature of the catalyst at the outlet of the exothermic zone maintained in the range of 800° to 900° F. with a difference between these temperatures of less than 120° F. For an extended run, the temperatures in both zones are kept at as low a level as possible during periods that the desired conversion is obtained, and this further lengths the life of the catalyst in both zones. The effectiveness of the temperature control method described is illustrated in the following example.

EXAMPLE 2

An extended life run was made using a potassium promoted nickel-alumina prepared by the coprecipitation technique to contain 45 wt. percent nickel interspersed with alumina and 2% K promoter. This run was terminated after a total of 1278 hours. The first 1016 hours were run at constant conditions of 2.8 w./h./w. (weight of hydrocarbon feed per hour per weight of catalyst) using 95% n-hexane feed under 500 p.s.i.g. and 2 lbs. $H_2O$ per lb. of hydrocarbon feed. By removing heat to lower the temperature in the exothermic zone and supplying such heat to the endothermic zone the temperature in the fluid stream between the endothermic zone and the exothermic zone was maintained at 700° F. Conversion of the hydrocarbon feed was constant at nearly 100% for 400 hours after which there was a slow decline of conversion to about 50% at hour 1000, the temperature level being maintained constant. During this operation at a fixed temperature a petroleum naphtha feed was substituted for the n-hexane feed for a period of 100 hours. By returning to the 95% n-hexane feed, the conversion level was raised practically in line with the initial conversion, taking into account the normal slow deactivation rate, indicating that the catalyst can also convert a light naphtha without deleterious effects. The spent catalyst after the 1278 hours was inspected. The carbon on the catalyst was found to be very low, less than 0.5%. The total surface-area of the catalyst declined from the initial 146 to 58 m.²/g., the nickel surface-area declined from 25 to 5 m.²/g.

The foregoing experiment demonstrates the ability of the highly active catalyst to remain highly active for a long period of time with suitable temperature control. The conversion can be maintained at a high level, at or above 90% for over 400 hours by raising the temperature periodically, e.g., on the average of 5° F. every 50 hours, so that from hour 400 to hour 1000 the increase in temperature at the inlet of the endothermic reaction zone and in the exothermic reaction zone need be only a total of 60° to 75° F., thus making the maximum temperature less than 900° F. in 1000 hours of operation.

Significant determinations made by the tests using the method of temperature control and analysis showed that earlier concepts of producing methane from the higher boiling normally liquid hydrocarbons by the reaction with steam in the presence of a nickel catalyst were fundamentally incorrect. According to earlier concepts, the preferred method of operation used a heat-insulated reaction tube containing the catalyst to utilize the heat evolved by the exothermic reaction so that no additional heat would have to be supplied. To the contrary, it has been discovered through the use of the present invention that the exothermic heat is liberated principally in the final stage of reaction, mainly in the second half portion of the total reaction, and this tends to raise the temperature to such a high degree in said second half portion as to be detrimental for obtaining the desired high methane content product and detrimental in causing deactivation of the catalyst. Accordingly, as described herein, steps are taken to remove heat from the exothermic zone so as to prevent a high temperature gradient in this zone and to prevent heat build-up which would make the temperatures in both the endothermic and exothermic zones too high.

According to the earlier concepts, the preferred method of operation used initial temperatures above 752° F. (i.e. above 400° C.) and indicated that the catalyst bed temperature as a whole would be maintained at temperatures ranging from 788° F. (420° C.) to 1022° F. (550° C.). To obtain an increased methane content according to the present invention, the initial temperatures in the first portion of the catalyst should be kept below 400° C. even though this first portion of the catalyst is in the endothermic zone, because deactivation becomes rapidly more severe at temperatures of 752° F. and above.

According to the earlier concepts, the formation of methane was believed to occur by subjecting the feed at above 752° F. to the action of a nickel catalyst. Data obtained in accordance with the present invention show that this concept is unrealistic because the methane is formed in the exothermic zone mainly through the reaction of carbon monoxide with hydrogen at temperatures rising to above 752° F., the concentration of $CH_4$ increasing as the exit from the exothermic zone is approached by the gaseous reaction mixture where the temperature is increased to above 752° F. and generally to a level in the range of 780° to 820° F., the concentration of hydrogen being decreased as the amount of methane is increased with the increase of temperature.

The invention described is claimed as follows:

1. In a process of generating methane gas from a feed stream or paraffin hydrocarbon vapor mixed with steam by reaction in the presence of catalyst at temperatures in the range of 630° to 900° F., the improvement which comprises:
   (a) passing said feed stream into an endothermic reforming reaction zone in which a catalyst makes said hydrocarbon react with the steam at a temperature in the range of 630° to 720° F. to form a gaseous product containing principally $H_2$, $CO_2$, and CO;
   (b) passing said gaseous product into an inlet of an adjacent exothermic reaction zone in which a catalyst at temperatures in the range of 720° to 900° F. converts said gaseous product to methane-rich gases that flow to an outlet from said exothermic zone with a rise of temperature in the direction of flow of gases from said inlet to said outlet; and
   (c) conducting heat from said exothermic zone to said endothermic zone for moderating said rise of temperature in the exothermic zone and supplying heat to said endothermic zone.

2. The process of claim 1 wherein said heat is conducted from the exothermic zone to the endothermic zone by indirect heat exchange between the hot gases of the exothermic zone and said feedstream to the endothermic zone.

3. The process of claim 1 wherein the temperature at the inlet of the endothermic zone ranges from 660° F. to 720° F. and the temperature at the outlet of said exothermic zone range from 800° F. to 900° F.

4. The process of claim 3 wherein the difference in temperature between the inlet to said endothermic zone and the outlet to said exothermic zone ranges less than about 120° F.

References Cited

UNITED STATES PATENTS

| | | | |
|---|---|---|---|
| 3,320,182 | 5/1967 | Taylor et al. | 48—214 X |
| 2,029,604 | 2/1936 | Bayer et al. | 23—288.9 |
| 2,700,598 | 1/1955 | Odell | 48—215 |
| 2,711,419 | 6/1955 | Milbourne et al. | 48—214 |
| 2,925,319 | 2/1960 | Groll | 23—1 |
| 3,106,457 | 10/1963 | Lockerbie et al. | 23—212 |
| 3,119,667 | 1/1964 | McMahon | 48—214 X |

FOREIGN PATENTS

| | | |
|---|---|---|
| 820,257 | 9/1959 | Great Britain. |

JOSEPH SCOVRONEK, *Primary Examiner.*

U.S. Cl. X.R.

23—288; 48—197